United States Patent
Karczewicz

(10) Patent No.: US 8,325,819 B2
(45) Date of Patent: Dec. 4, 2012

(54) VARIABLE LENGTH CODING TABLE SELECTION BASED ON VIDEO BLOCK TYPE FOR REFINEMENT COEFFICIENT CODING

(75) Inventor: Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1155 days.

(21) Appl. No.: 11/867,999

(22) Filed: Oct. 5, 2007

(65) Prior Publication Data

US 2008/0089423 A1 Apr. 17, 2008

Related U.S. Application Data

(60) Provisional application No. 60/829,274, filed on Oct. 12, 2006, provisional application No. 60/883,741, filed on Jan. 5, 2007, provisional application No. 60/829,276, filed on Oct. 12, 2006.

(51) Int. Cl.
*H04N 7/12* (2006.01)
(52) U.S. Cl. ............... 375/240.23; 375/240.24; 382/232
(58) Field of Classification Search .................. None
See application file for complete search history.

(56) References Cited

U.S. PATENT DOCUMENTS

| | | | |
|---|---|---|---|
| 5,400,075 A | 3/1995 | Savatier | |
| 5,640,420 A | 6/1997 | Jung | |
| 5,650,782 A | 7/1997 | Kim | |
| 5,793,897 A * | 8/1998 | Jo et al. | 382/246 |
| 5,835,145 A | 11/1998 | Ouyang et al. | |
| 5,982,437 A * | 11/1999 | Okazaki et al. | 375/240.14 |
| 6,069,575 A | 5/2000 | Kinouchi et al. | |
| 6,144,322 A | 11/2000 | Sato | |
| 6,275,531 B1 | 8/2001 | Li | |
| 6,690,307 B2 | 2/2004 | Karczewicz | |
| 6,700,933 B1 | 3/2004 | Wu et al. | |
| 6,919,828 B2 | 7/2005 | Jeon et al. | |

(Continued)

FOREIGN PATENT DOCUMENTS

JP 6225279 A 8/1994

(Continued)

OTHER PUBLICATIONS

Macnicol, James et al., "Scalable Video Coding by Stream Morphing," IEEE Transactions on Circuits and Systems for Video Technology, vol. 15, No. 2, Feb. 2005, pp. 306-319.

(Continued)

*Primary Examiner* — Kibrom T Hailu
(74) *Attorney, Agent, or Firm* — Brent A. Boyd

(57) ABSTRACT

This disclosure describes techniques for coding an enhancement layer in a scalable video coding (SVC) scheme. The techniques may be used in coding transform coefficients, and are particularly useful in variable length coding of refinement coefficients of an enhancement layer of a SVC scheme. According to the techniques of this disclosure, information is transmitted from an encoder device to a decoder device that identifies which variable length coding tables should be used for the decoding two or more different types of video blocks. The information may be transmitted once per frame (or other coded unit), and may identify a first table to be used for intra-coded blocks and a second table to be used for inter-coded blocks of a respective frame. The decoder performs table selection based on this information, and decodes different types of video blocks using the selected table for each block type.

32 Claims, 8 Drawing Sheets

U.S. PATENT DOCUMENTS

| | | | |
|---|---|---|---|
| 6,980,597 | B1 | 12/2005 | Ling |
| 7,348,903 | B2* | 3/2008 | Lee et al. ............... 341/67 |
| 7,664,176 | B2 | 2/2010 | Bao et al. |
| 2001/0033697 | A1 | 10/2001 | Shimada |
| 2003/0009722 | A1 | 1/2003 | Sugiyama et al. |
| 2003/0151529 | A1 | 8/2003 | Karczewicz |
| 2004/0005096 | A1* | 1/2004 | Kim et al. ............... 382/243 |
| 2004/0179606 | A1 | 9/2004 | Zhou et al. |
| 2005/0025246 | A1 | 2/2005 | Holcomb |
| 2006/0078049 | A1 | 4/2006 | Bao et al. |
| 2006/0153294 | A1 | 7/2006 | Wang et al. |
| 2006/0233255 | A1 | 10/2006 | Ridge et al. |
| 2006/0273939 | A1 | 12/2006 | Tanaka et al. |
| 2007/0080832 | A1 | 4/2007 | Yang et al. |
| 2008/0089420 | A1 | 4/2008 | Karczewicz |
| 2008/0089422 | A1 | 4/2008 | Karczewicz |
| 2008/0089424 | A1 | 4/2008 | Karczewicz et al. |
| 2009/0129467 | A1 | 5/2009 | Li et al. |

FOREIGN PATENT DOCUMENTS

| | | |
|---|---|---|
| JP | 7274171 A | 10/1995 |
| JP | 8046521 A | 2/1996 |
| JP | 08280032 | 10/1996 |
| JP | 11242573 A | 9/1999 |
| JP | 11252573 A | 9/1999 |
| JP | 2001094982 | 4/2001 |
| JP | 2002058028 A | 2/2002 |
| JP | 2008507191 A | 3/2008 |
| JP | 2009506710 A | 2/2009 |
| KR | 20010105629 | 11/2001 |
| KR | 20030081772 | 10/2003 |
| KR | 100606588 | 8/2006 |
| KR | 20070062393 A | 6/2007 |
| KR | 1032277 | 4/2011 |
| RU | 2117388 | 8/1998 |
| RU | 2119727 | 9/1998 |
| RU | 2004125588 | 1/2006 |
| RU | 2005113308 | 1/2006 |
| RU | 2335845 | 10/2008 |
| TW | 200612755 | 4/2006 |
| TW | 200627963 | 8/2006 |
| WO | WO9517073 A1 | 6/1995 |
| WO | WO03053066 A1 | 6/2003 |
| WO | WO2005094081 | 10/2005 |
| WO | WO2006067712 A1 | 6/2006 |
| WO | WO2006075235 A1 | 7/2006 |

OTHER PUBLICATIONS

International Preliminary Report on Patentability—PCT/US07/080832, International Search Authority—European Patent Office, Nov. 27, 2008.

Gary J. Sullivan et al: Joint Video Team (JVT) of ISO/IEC MPEG & 14-22, ITU-T VCEG (ISO/IEC JTC1/SC29/WG11 and 24,25 ITU-T SG16 Q .6).

Jian Zhou et al, FGS enhancement layer truncation with minimized intra-frame quality variation, Multimedia and Expo, 2003. Proceedings. 2003 International Conference on Jul. 6-9, 2003, Piscataway, vol. 2, Jul. 6, 2003, pp. 361-364.

Nevdiaev L.M., Telecommunications Technology, English-Russian Explanatory Dictionary, Communications and Business, Moscow, 2002, pp. 103, 136.

Report of 78th meeting, International organization of standardization organization international de normalization ISO/IEC JTC 1/sc29/WG 11 coding of moving pictures and audio, p. 139.

Ridge J. et al., Improvement of FGS refinement, Joint Video Team (JVT) of ISO/IEC MPEG&ITU-T VCEG, JVT-V077, Jan. 13-19, 2007.

Shima M: " CE1: Complexity reduction for adaptive VLC", Geneva: ISO, Ch. 10 Jan. 2006, XP030006289.

Xianglin Wang et al, CE7 Report, Multiple FGS layer coding for low-delay applications, Joint Video Team (JVT) of ISO/IEC MPEG &ITU-T VCEG, JVT-R077, Jan. 14, 2006.

Yen-Kuang Chen et al, Implementation of Real-Time MPEG-4 FGS Encoder, Advances in Multimedia Information Processing—PCM 2002, Springer Berlin/Heidelberg, 2002, pp. 453-466.

Karczewicz, M., et al., "Improved Refinement Coefficients Coding," Joint Video Team (JVT) of ISO/IEC MPEG & ITU-T VCEG (ISO/IEC JTC1/SC29/WG11 and ITU-T SG16 Q.6), 21st Meeting: Hangzhou, China Oct. 20-27, 2006, No. JVT-U132, Oct. 20, 2006, XP030006778.

Ling, et al., "Bitplane Coding of DCT Coefficients for Image and Video Compression," Proceedings of the SPIE, SPIE, Bellingham, VA, vol. 3653, No. 1-2, 1998, pp. 500-508.

Marpe, et al., "Improved CABAC for Progressive Refinement Slices," Joint Video Team (JVT) of ISO/IEC MPEG & ITU-T VCEG (ISO/IEC JTC1/SC29/WG11 and ITU-T SG16 Q.6, 20th Meeting: Klagenfurt, Austria, Jul. 15-21, 2006, No. JVT-T077.

Ridge, J., et al., "CE8: VLCs for SVC," Joint Video Team (JVT) of ISO/IEC MPEG & ITU-T VCEG (ISO/IEC JTC1/SC29/WG11 and ITU-T SG16 Q.6, 17th Meeting: Nice, France, Oct. 14-21, 2005 No. JVT-Q040-L, Oct. 14, 2005, XP030006203.

Ridge, J., et al., "Variable Length Codes for SVC," Joint Video Team (JVT) of ISO/IEC MPEG & ITU-T VCEG (ISO/IEC JTC1/SC29/WG11 and ITU-T SG16 Q.6), 16th Meeting: Poznan, Poland, Jul. 24-29, 2005, No. JVT-P056, Jul. 24, 2005, XP0301006095.

Shima, M. "Modified VLC for Refinement Pass," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S031, Mar. 31, 2006, XP030006410.

Wiegand, et al., "Joint Draft 6: Scalable Video Coding," JVT-S 201, Apr. 2006, Geneva.

Wiegand, et al., "Joint Draft 9 of SVC Amendment," JVT-V 201, Jan. 2007, Marrakech, Morocco.

Ye, Y., et al., "Improvements to FGS Layer Variable Length Coder," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S066, Mar. 31, 2006, XP030006445.

ITU-T Recommendation H.223, Multiplexing Protocol for Low Bit Rate Multimedia Communication, (Jul. 2001).

ITU-T Recommendation H.263 Video Coding for Low Bit Rate Communication (Jan. 2005).

ITU-T Recommendation H.264, Advanced Video Coding for Generic Audiovisual Services, Mar. 2005.

"Forward Link Only Air Interface Specification for Terrestrial Mobile Multimedia Multicase," TIA-1099, Aug. 2006.

International Search Report—PCT/US07/080832, International Search Authority—European Patent Office, Apr. 15, 2008.

Written Opinion—PCT/US0/080832, International Search Authority—European Patent Office, Apr. 15, 2008.

Taiwan Search Report—TW096138307—TIPO—Apr. 19, 2011.

Taiwan Search Report—TW097108236—TIPO—Jun. 5, 2011.

Bae-Keun Lee and woo-Jin Han,VLC for FGS layer in 8×8 transform, Joint Video Team (JVT) of ISO/IEC MPEG & ITU-T VCEG (ISO/IEC JTC1/SC29/WG11 and ITU-T SG16 Q.6) 17th Meeting: Nice, FR, Document: JVT-Q057, ITU-T, Oct. 14, 2005.

Bae-Keun Lee,CE1: Improvement CAVLC for SVC,Joint Video Team (JVT) of ISO/IEC MPEG & ITU-T VCEG (ISO/IEC JTC1/SC29/WG11 and ITU-T SG16 Q.6) 17th Meeting: Nice, FR, Document: JVT-Q301, ITU-T, Oct. 21, 2005.

Julien Reichel et al., Draft of Joint Scalable Video Model JSVM-4 Annex G, Joint Video Team(JVT) of ISO/IEC MPEG & ITU-T VCEG (ISO/IEC JTC1/SC29/WG11 and ITU-T SG16 Q.6) 17th Meeting: Nice, France, Document: JVT-Q201, Filename: JVT-Q202-AnnexG.doc, ITU-T, Nov. 18, 2005.

Karczewicz M., "Report of core experiment on improved refinement coefficients coding (CE1)", JVT-V095, Joint Video Team (JVT) of ISO/IEC MPEG & ITU-T VCEG, 22nd Meeting: Marrakech, Jan. 13-19, 2007, p. 1 para.3-p. 2 para.7.

* cited by examiner

VARIABLE LENGTH CODING TABLE SELECTION BASED ON VIDEO BLOCK TYPE FOR REFINEMENT COEFFICIENT CODING

This application claims the benefit of the following U.S. Provisional Applications, the entire content each of which is incorporated herein by reference:

U.S. Provisional Application No. 60/829,274, filed Oct. 12, 2006,

U.S. Provisional Application No. 60/883,741, filed Jan. 5, 2007, and

U.S. Provisional Application No. 60/829,276, filed Oct. 12, 2006.

TECHNICAL FIELD

This disclosure relates to digital video coding and, more particularly, variable length coding (VLC) of transform coefficients in enhancement layers of a scalable video coding (SVC) scheme.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

In video coding, video compression often includes spatial prediction, motion estimation and motion compensation. Intra-coding relies on spatial prediction to reduce or remove spatial redundancy between video blocks within a given video frame. Inter-coding relies on temporal prediction to reduce or remove temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vectors to generate prediction video blocks from a reference frame. After motion compensation, a residual video block is formed by subtracting the prediction video block from the original video block to be coded.

The video encoder usually applies transform, quantization and variable length coding (VLC) processes to further reduce the bit rate associated with communication of the residual block. VLC of the residual blocks involves the application of variable length codes to further compress residual coefficients produced by the transform and quantization operations. For example, a VLC table may be used to match different sets of coefficients to variable length codewords in a manner that promotes coding efficiency. Different VLC tables may be used for different video content. A video decoder performs inverse VLC operations to reconstruct the coefficients, and then inverse transforms the coefficients. The video decoder can decode the video information based on the motion information and residual information associated with video blocks.

Some video coding makes use of scalable techniques. For example, scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. The base layer may be transmitted in a manner that is more reliable than the transmission of enhancement layers. Enhancement layers may add spatial resolution to frames of the base layer, or may add additional frames to increase the overall frame rate. In one example, the most reliable portions of a modulated signal may be used to transmit the base layer, while less reliable portions of the modulated signal may be used to transmit the enhancement layers. Enhancement layers may define different types of coefficients, referred to as significant coefficients and refinement coefficients.

SUMMARY

In general, this disclosure describes techniques for coding an enhancement layer in a scalable video coding (SVC) scheme. The techniques provide for the selection of variable length coding (VLC) tables at a decoder in a manner that promotes computational simplicity. The techniques may be used in coding transform coefficients, and are particularly useful in VLC of refinement coefficients of an enhancement layer of an SVC scheme. Refinement coefficients refer to coefficients of an enhancement layer for which the corresponding coefficients of a previous layer in the SVC scheme had non-zero values. Variable length coding of refinement coefficients may be performed separately from variable length coding of significant coefficients, which refer to coefficients of an enhancement layer for which the corresponding coefficients of a previous layer in the SVC scheme had values of zero.

According to the techniques of this disclosure, information is transmitted from an encoder device to a decoder device that identifies which VLC tables should be used for the decoding of two or more different types of video blocks. The information may be transmitted once per frame (or other coded unit such as a slice or FGS layer of a frame), and may identify a first table to be used for intra-coded blocks and a second table to be used for inter-coded blocks of a respective frame. The decoder performs VLC table selection based on this information, and decodes the video blocks using the selected VLC tables. Also, in some cases, the encoder and decoder have an agreement regarding the tables to be used for different types of blocks. In this case, the tables that are used are block type dependent, but no additional information has to be transmitted from encoder to the decoder since the encoder and decoder have an agreement.

In one example, this disclosure provides a method of coding an enhancement layer of an SVC scheme, the method comprising encoding coefficients associated with video blocks of the enhancement layer based on variable length coding tables, generating information identifying a first variable length coding table to be used by a decoding device to decode a first type of the video blocks and a second variable length coding table to be used by the decoding device to decode a second type of the video blocks, transmitting information representing the encoded coefficients to a decoding device, and transmitting the information identifying the first variable length coding table to be used by the decoding device to decode the first type of the video blocks and the second variable length coding table to be used by the decoding device to decode the second type of the video blocks.

In another example, this disclosure provides a method of coding an enhancement layer of an SVC scheme, the method comprising receiving information representing encoded coefficients associated with video blocks of the enhancement layer, receiving information identifying a first variable length coding table to be used to decode a first type of the video blocks and a second variable length coding table to be used to decode a second type of the video blocks, selecting tables for decoding the information representing the encoded coefficients based on the information identifying the first and second variable length coding table to be used, and decoding the information representing the encoded coefficients based on the selected tables.

In another example, this disclosure provides a device that codes an enhancement layer of an SVC scheme, the device comprising an encoder that encodes coefficients associated with video blocks of the enhancement layer based on variable length coding tables and generates information identifying a first variable length coding table to be used by a decoding device to decode a first type of the video blocks and a second variable length coding table to be used by the decoding device to decode a second type of the video blocks, and a transmitter that transmits information representing the encoded coefficients and transmits the information identifying a first variable length coding table to be used by the decoding device to decode the first type of the video blocks and the second variable length coding table to be used by the decoding device to decode a second type of video block.

In another example, this disclosure provides a device that codes an enhancement layer of an SVC scheme, the device comprising a receiver that receives information representing encoded coefficients associated with video blocks of the enhancement layer, and receives information identifying a first variable length coding table to be used to decode a first type of the video blocks and a second variable length coding table to be used to decode a second type of the video blocks, and a decoder that selects tables for decoding the information representing the encoded coefficients based on the information identifying the first and second variable length coding table to be used, and decodes the information representing the encoded coefficients based on the selected tables.

In another example, this disclosure provides a device that codes an enhancement layer of an SVC scheme, the device comprising means for encoding coefficients associated with video blocks of the enhancement layer based on variable length coding tables, wherein the means for encoding generates information identifying a first variable length coding table to be used by the decoding device to decode a first type of the video blocks and a second variable length coding table to be used by the decoding device to decode a second type of the video blocks, and means for transmitting information representing the encoded coefficients to a decoding device, wherein the means for transmitting transmits the information identifying the first variable length coding table to be used by the decoding device to decode the first type of the video blocks and the second variable length coding table to be used by the decoding device to decode the second type of the video blocks.

In another example, this disclosure provides a device that codes an enhancement layer of an SVC scheme, the device comprising means for receiving encoded coefficients associated with video blocks of the enhancement layer, wherein the means for receiving also receives information identifying a first variable length coding table to be used to decode a first type of the video blocks and a second variable length coding table to be used to decode a second type of the video blocks, means for selecting tables for decoding the information representing the encoded coefficients based on the information identifying the first and second variable length coding table to be used, and means for decoding the information representing the encoded coefficients based on the selected tables.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to code an enhancement layer of an SVC scheme, wherein the instructions cause the device to encode coefficients associated with video blocks of the enhancement layer based on variable length coding tables, generate information identifying a first variable length coding table to be used by a decoding device to decode a first type of video block and a second variable length coding table to be used by the decoding device to decode a second type of video block, transmit information representing the encoded coefficients to a decoding device, and transmit the information identifying the first variable length coding table to be used by the decoding device to decode the first type of video block and the second variable length coding table to be used by the decoding device to decode the second type of video block.

In addition, this disclosure also contemplates a computer-readable medium comprising instructions that upon execution in a video coding device cause the device to code an enhancement layer of an SVC scheme, wherein upon receiving information representing encoded coefficients associated with video blocks of the enhancement layer and receiving information identifying a first variable length coding table to be used to decode a first type of the video blocks and a second variable length coding table to be used to decode a second type of the video blocks, the instructions cause the device to select tables for decoding the information representing the encoded coefficients based on the information identifying the first and second variable length coding table to be used, and decode the information representing the encoded coefficients based on the selected tables.

In some cases, the computer readable medium may form part of a computer program product, which may be sold to manufacturers and/or used in a video coding device. The computer program product may include the computer readable medium, and in some cases, may also include packaging materials.

This disclosure may also be directed to a circuit, such as an integrated circuit, chipset application specific integrated circuit (ASIC), field programmable gate array (FPGA), logic, or various combinations thereof configured to perform one or more of the techniques described herein. Accordingly, this disclosure also contemplates a circuit configured for coding an enhancement layer of an SVC scheme, wherein the circuit is configured to encode coefficients associated with video blocks of the enhancement layer based on variable length coding tables, generate information identifying a first variable length coding table to be used by a decoding device to decode a first type of the video blocks and a second variable length coding table to be used by the decoding device to decode a second type of the video blocks, transmit information representing the encoded coefficients to a decoding device, and transmit the information identifying the first variable length coding table to be used by the decoding device to decode the first type of the video blocks and the second variable length coding table to be used by the decoding device to decode the second type of the video blocks.

This disclosure also contemplates a circuit configured for coding an enhancement layer of a scalable video coding (SVC) scheme, wherein the circuit is configured to receive information representing encoded coefficients associated with video blocks of the enhancement layer, receive information identifying a first variable length coding table to be used to decode a first type of the video blocks and a second variable length coding table to be used to decode a second type of the video blocks, select tables for decoding the information representing the encoded coefficients based on the information identifying the first and second variable length coding table to be used, and decode the information representing the encoded coefficients based on the selected tables.

In addition, this disclosure contemplates a circuit configured for coding an enhancement layer of a SVC scheme, wherein the circuit is configured to receive information representing encoded coefficients associated with video blocks of the enhancement layer, select different variable length coding tables to be used to decode the information based on block types associated with the video blocks in accordance with an agreement established with an encoder, decode the information representing the encoded coefficients based on the selected tables.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
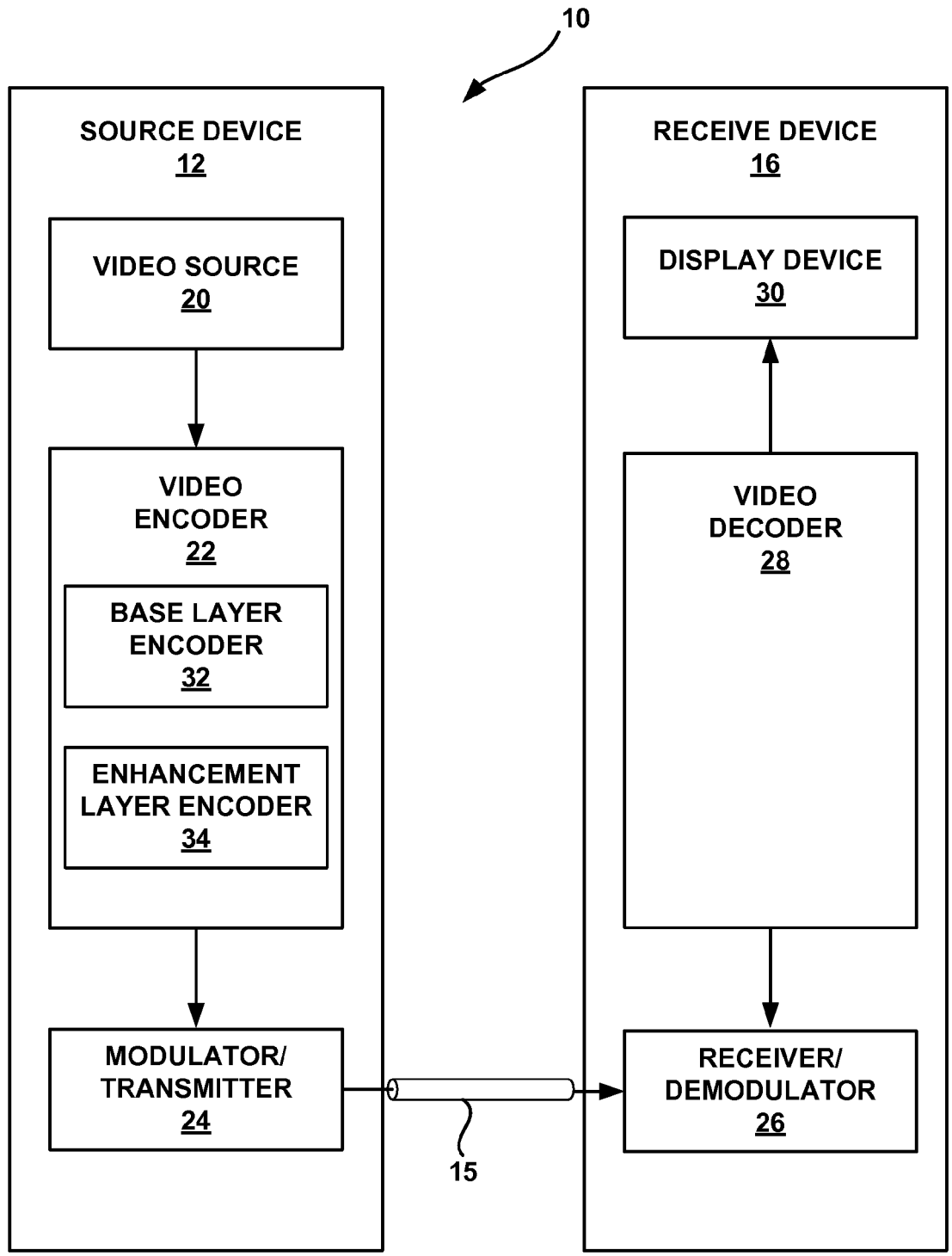
FIG. 1 is an exemplary block diagram illustrating a video encoding and decoding system.

This disclosure describes techniques for coding an enhancement layer in a scalable video coding (SVC) scheme. The techniques provide for the selection of variable length coding (VLC) tables at a decoder in a manner that promotes computational simplicity. The techniques may be used in coding transform coefficients, and are particularly useful in variable length coding of refinement coefficients of an enhancement layer of a SVC scheme. Refinement coefficients refer to coefficients of an enhancement layer for which the corresponding coefficients of a previous layer in the SVC scheme had non-zero values. Variable length coding of refinement coefficients may be performed separately from variable length coding of significant coefficients (e.g., for which the corresponding coefficients of a previous layer in the SVC scheme had values of zero).

According to the techniques of this disclosure, information identifying which VLC tables should be used for the decoding of two or more different types of video blocks is transmitted from an encoder device to a decoder device. The information may be transmitted once per frame (or other coded unit), and may identify a first table to be used for intra-coded blocks and a second table to be used for inter-coded blocks of a respective frame. The decoder performs table selection based on this information, and decodes the video blocks using the selected tables.

At the encoder device, VLC table selection for the encoding of different video blocks may be performed based on information gathered for previously or currently coded frames. For example, statistical analysis of previously encoded frames may be performed to facilitate table selection at the encoder device. Such computationally intensive analysis, however, may be avoided at the decoder device. Instead, information identifying tables to be selected for first and second types of video blocks, e.g., intra-coded block and inter-coded blocks, may be transmitted from the encoder device to the decoder device. The decoder device can use this transmitted information to facilitate proper table selections. Alternatively, in some cases, the encoder and decoder may have an agreement regarding the tables to be used for different types of blocks. In this case, the tables that are used are block type dependent, but no additional information has to be transmitted from encoder to the decoder since the encoder and decoder have an agreement.

The selected tables at the encoder may be highly dependent upon the level of quantization used in the coding process. The level of quantization used, in turn, may be dependent upon the type of video block. Since the level of quantization used at the encoder is generally unknown to the decoder, information regarding video block type provides a useful mechanism for table selection at the decoder. In particular, since the level of quantization may be dependent upon the type of video block, VLC table selection at the decoder based on video block type can be useful. VLC tables are identified to the decoder for different video block types, and the decoder can determine the type associated with a respective video block and use the appropriate VLC table to decode that respective video block.

FIG. 1 is a block diagram illustrating a video encoding and decoding system 10. As shown in FIG. 1, system 10 includes a source device 12 that transmits encoded video to a receive device 16 via a communication channel 15. Source device 12 may include a video source 20, video encoder 22 and a modulator/transmitter 24. Receive device 16 may include a receiver/demodulator 26, video decoder 28, and display device 30. System 10 may be configured to apply techniques for variable length coding (VLC) of video information associated with an enhancement layer in a scalable video coding (SVC) scheme.

SVC refers to video coding in which a base layer and one or more scalable enhancement layers are used. For SVC, a base layer typically carries video data with a base level of quality. One or more enhancement layers carry additional video data to support higher spatial, temporal and/or signal-to-noise SNR levels. Enhancement layers may be defined relative to the previously encoded layer. Enhancement layers define at least two different types of coefficients, referred to as significant coefficients and refinement coefficients. Refinement coefficients may define values relative to the corresponding values of the previously encoded layer. Frames of enhancement layers sometimes only include a portion of the total number of video blocks in the base layer or previous enhancement layer, e.g., only those blocks for which enhancement is performed.

Significant coefficients refer to coefficients for which corresponding coefficients in the previous layer had values of zero. Refinement coefficients refer to coefficients for which corresponding coefficients in the previous layer had non-zero values in the previous layer. Variable length coding of enhancement layers typically involves a two-pass approach. A first pass is performed to run-length code the significant coefficients, and another pass is performed to code the refinement coefficients. The techniques of this disclosure are particularly useful for the variable length coding of refinement coefficients, although this disclosure is not necessarily limited in this respect.

According to the techniques of this disclosure, information is transmitted from source device 12 to receive device 16 that identifies which VLC tables should be used for the decoding two or more different types of video blocks. The information may be transmitted once per frame (or other coded unit), and may identify a first table to be used for intra-coded blocks and a second table to be used for inter-coded blocks of a respective frame. The information may comprise one or more bits that identify a first VLC table for intra-coded blocks and one or more bits that identify a second VLC table for inter-coded blocks. Video decoder 28 of receive device 16 performs table selection based on this information, and decodes the video blocks using the selected tables. Again, however in some cases, encoder 22 and decoder 28 may have an agreement regarding the tables to be used for different types of blocks. In this case, the tables that are used are block type dependent, but no additional information has to be transmitted from source device 12 to receive device 16 since encoder 22 and decoder 28 have an agreement.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to receive device 16. Communication channel 15 may include various base stations or other components to facilitate communication from source device 12 to receive device 16.

Source device 12 and receive device 16 may comprise any of a wide variety of wireless communication devices, such as wireless digital televisions, wireless communication device handsets, personal digital assistants (PDAs), wireless laptop or desktop computers, wireless digital cameras, wireless digital recording devices, wireless video gaming devices, wireless video game consoles, cellular or satellite radio telephones, and the like.

Source device 12 generates coded video data for transmission to receive device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video and computer-generated video. In some cases, if video source 20 is a video camera, source device 12 and receive device 16 may form so-called camera phones or video phones. In each case, the captured, pre-captured or computer-generated video may be encoded by video encoder 22 for transmission from video source device 12 to video decoder 28 of video receive device 16 via modulator/transmitter 22, communication channel 15 and receiver/demodulator 26. The video encoding and decoding processes may implement the run-length coding techniques described herein to improve the processes. Display device 30 displays the decoded video data to a user, and may comprise any of a variety of display devices such as a cathode ray tube, a liquid crystal display (LCD), a plasma display, an organic light emitting diode (OLED) display, or another type of display device.

Video encoder 22 and video decoder 28 may be configured to support SVC for spatial, temporal and/or signal-to-noise ratio (SNR) scalability. In some aspects, video encoder 22 and video decoder 28 may be configured to support fine granularity SNR scalability (FGS) coding for SVC. Encoder 22 and decoder 28 may support various degrees of scalability by supporting encoding, transmission and decoding of a base layer and one or more scalable enhancement layers. Again, for scalable video coding, a base layer carries video data with a baseline level of quality. One or more enhancement layers carry additional data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers.

In order to support SVC, video encoder 22 may include a base layer encoder 32 and one or more enhancement layer encoders 34 to perform encoding of a base layer and one or more enhancement layers, respectively. The techniques of this disclosure, which involve VLC table selection, are applicable to the coding of video blocks of enhancement layers in SVC.

Video decoder 28 may include a combined base/enhancement decoder that decodes both base layer and enhancement layer video blocks. Video decoder 28 may decode the video blocks associated with both base and enhancement layers, and combine the decoded video to reconstruct the frames of a video sequence. Display device 30 receives the decoded video sequence, and presents the video sequence to a user.

Video encoder 22 and video decoder 28 may operate according to a video compression standard, such as MPEG-2, MPEG-4, ITU-T H.263, or ITU-T H.264/MPEG-4, Part 10, Advanced Video Coding (AVC). Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on an SVC extension to H.264/MPEG-4 AVC. The specification of the evolving SVC extension is in the form of a Joint Draft (JD). The Joint Scalable Video Model (JSVM) created by the JVT implements tools for use in scalable video, which may be used within system 10 for various coding tasks described in this disclosure. Detailed information concerning Fine Granularity SNR Scalability (FGS) coding can be found in the Joint Draft documents, and particularly in Joint Draft 6 (SVC JD6), Thomas Wiegand, Gary Sullivan, Julien Reichel, Heiko Schwarz, and Mathias Wien, "Joint Draft 6: Scalable Video Coding," JVT-S 201, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, January 2007, Marrakech, Morocco.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive devices, each of which may be similar to receive device 16 of FIG. 1.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In addition, source device 12 and receive device 16 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 24 of source device 12 and receiver/demodulator 26 of receive device 16 in FIG. 1.

A video sequence includes a series of video frames. Video encoder 22 operates on blocks of pixels (or blocks of transformed coefficients) within individual video frames in order to encode the video data. The video blocks may have fixed or varying sizes, and may differ in size according to a specified coding standard. In some cases, each video frame is a coded unit, while in other cases, each video frame may be broken includes a series of slices that form coded units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. According to this disclosure, VLC table selection information for intra-coded blocks and inter-coded blocks may be transmitted from source device 12 to receive device 16 once per coded unit, e.g., once per frame, once per slice or once per FGS layer of a frame. This information may then be used for VLC table selection for coding of transform coefficients of video blocks associated with that respective coded unit.

The form and content of the information transmitted to identify the different VLC tables may vary. For example, the information may be formulated as two different single-bit or multi-bit codes that identify which VLC table to be used to decode a first type of video block and which VLC table to be used to decode a second type of video block. For each frame to be decoded, one single-bit or multi-bit code may be sent for intra-blocks and another single-bit or multi-bit code may be sent for inter-blocks. Decoder 28 selects different VLC tables for decoding of intra- and inter-coded blocks based on the tables identified in the codes.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. As noted, each slice may be an independently decodable unit of a video frame. After prediction, a transform may be performed on the 8×8 residual block or 4×4 residual block, and an additional transform may be applied to the DC coefficients of the 4×4 blocks for chroma components or luma component if an intra_16× 16 prediction mode is used.

Following intra- or inter-based predictive coding, additional coding techniques may be applied to the transmitted bitstream. These additional coding techniques may include transformation techniques (such as the 4×4 or 8×8 integer transform used in H.264/AVC or a discrete cosine transformation DCT), and variable length coding. Blocks of transformation coefficients may be referred to as video blocks. In other words, the term "video block" refers to a block of video data regardless of the domain of the information. Thus, video blocks can be in a pixel domain or a transformed coefficient domain. The application of VLC coding will be described generally in this disclosure with respect to blocks of transform coefficients.

This disclosure provides techniques for variable length coding of refinement coefficients. Again, refinement coefficients refer to coefficients that had non-zero values in the previous layer, whereas significant coefficients refer to coefficients that had values of zero in the previous layer. According to this disclosure, information may be transmitted from source device 12 to receive device 16 to effectuate VLC table selection at the decoder for two or more different types of video blocks. One of a plurality of different VLC tables may be selected for each video block type based on information sent from source device 12 to receive device 16. Receive device then selects between the two identified VLC tables based on the type of video block being decoded.

Each VLC table may include a set of code symbols having different lengths. The code symbols may be assigned respective characteristics within the video block, such as a particular zero run length of refinement coefficients. In some cases, the tables are static, but in other cases, the tables themselves may be generated or updated based on encoding statistics so that the variable length code words map to sets of coefficients in a manner that promotes coding efficiency. Of course, if the tables are updated at the encoder, the table updates would also need to be updated at the decoder.

Encoder 22 and decoder 28 may perform reciprocal methods that code an enhancement layer in SVC scheme. At encoder 22, table selection for the encoding of different video blocks may be performed based on information gathered for currently or previously coded frames. If the selection is based on previously coded frames, single pass coding may be used, but if the coding is based on currently coded frames, this may require two pass coding. In some cases, statistical analysis of previously encoded frames may be performed to facilitate table selection at encoder 22. Such computationally intensive analysis, however, may be avoided at decoder 28. Instead, information identifying tables for first and second types of video blocks, e.g., intra-coded block and inter-coded blocks, may be transmitted from source device 12 to receive device 16. Decoder 28, then, can use this transmitted information to facilitate proper table selections.

The selected tables at the encoder (e.g., which may be selected based on statistics) may be highly dependent upon the level of quantization used in the coding process. The level of quantization used, in turn, may be dependent upon the type of video block. Since the level of quantization used at encoder 22 is generally unknown to decoder 28, information regarding video block type provides a useful alternative to apply at decoder 28. Therefore, tables are identified to decoder 28 for different video block types, and decoder 28 can determine the type associated with a respective video block and use the appropriate VLC table to decode that respective video block. As used herein, the term coding generally refers to at least a portion of either the encoding or decoding processes. Video encoder 22 encodes the data, while video decoder 28 decodes the data.

The VLC tables themselves may assign codewords to different sets of transform coefficients. Sets of zero value coefficients may be represented by run lengths of zeros, and more common run lengths may be assigned shorter VLC codes. Less common run lengths may be assigned longer VLC codes. Hence, selection of codes from the VLC tables may improve coding efficiency. The assignment of codes in the VLC tables may also be based on statistics during a table formation process, although static VLC tables could also be used.

Figure 2:
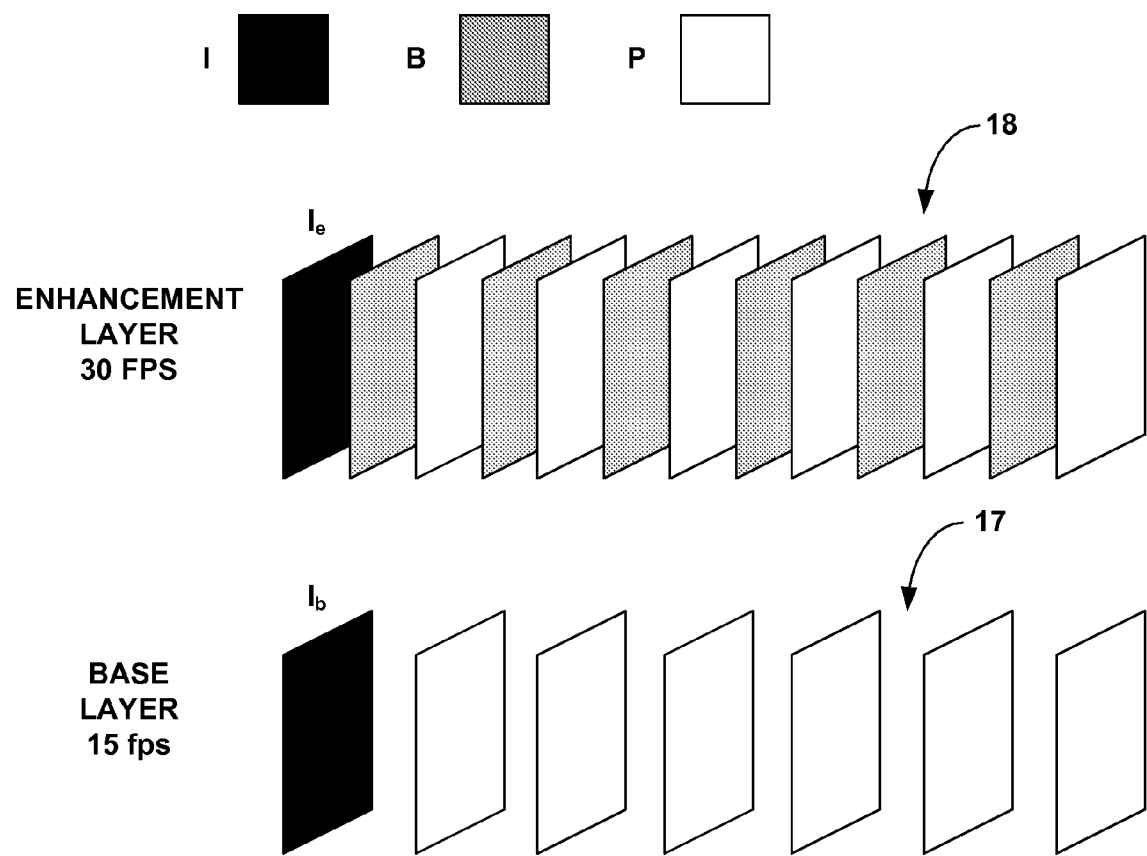
FIG. 2 is a conceptual diagram illustrating video frames of a base layer and an enhancement layer of a scalable video bitstream.

FIG. 2 is a diagram illustrating video frames within a base layer 17 and enhancement layer 18 of a scalable video bitstream. As noted above, the techniques of this disclosure are applicable to the coding of data of enhancement layers. Base layer 17 may comprise a bitstream containing encoded video data that represents the first level of spatial, temporal, or SNR scalability. Enhancement layer 18 may comprise a bitstream containing encoded video data that represents a second level of spatial, temporal and/or SNR scalability. Although a single enhancement layer is shown, several layers of enhancement may be used in some cases. The enhancement layer bitstream may be decodable only in conjunction with the base layer (or previous enhancement layer if multiple enhancement layer exist). Enhancement layer 18 contains references to the decoded video data in base layer 17. Such references may be used either in the transform domain or pixel domain to generate the final decoded video data.

Base layer 17 and enhancement layer 18 may contain intra (I), inter (P), and bi-directional (B) frames. Intra frames may include all intra-coded video blocks. I and P frames may include at least some inter-coded video blocks, but may also include some intra-coded blocks. The different frames of enhancement layer 17 need not include all of the video blocks in base layer 17. The P frames in enhancement layer 18 rely on references to P frames in base layer 17. By decoding frames in enhancement layer 18 and base layer 17, a video decoder is able to increase the video quality of the decoded video. For example, base layer 17 may include video encoded at a minimum frame rate of e.g., 15 frames per second, whereas enhancement layer 18 may include video encoded at a higher frame rate of e.g., 30 frames per second. To support encoding at different quality levels, base layer 17 and enhancement layer 18 may be encoded with a higher quantization parameter (QP) and lower QP, respectively. Moreover, base layer 17 may be transmitted in a manner that is more reliable than the transmission of enhancement layer 18. As an example, the most reliable portions of a modulated signal may be used to transmit base layer 17, while less reliable portions of the modulated signal may be used to transmit enhancement layer 18. The illustration of FIG. 2 is merely exemplary, as base and enhancement layers could be defined in many different ways.

Figure 3:
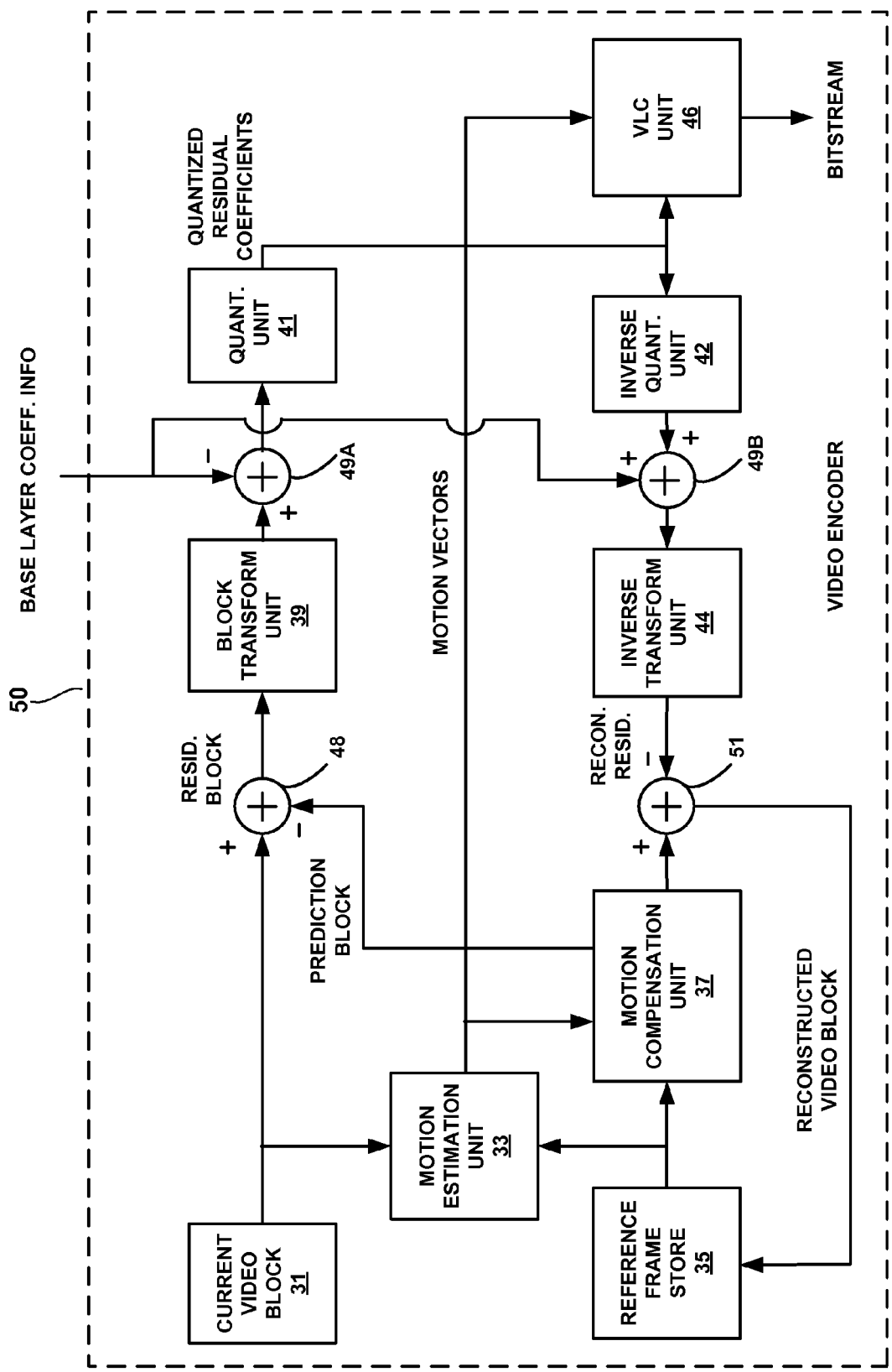
FIG. 3 is a block diagram illustrating an example of a video encoder consistent with this disclosure.

FIG. 3 is a block diagram illustrating an example of a video encoder 50 that includes a VLC unit 46 to encode data consistent with this disclosure. Video encoder 50 of FIG. 3 may correspond to enhancement layer encoder 34 of source device 12 in FIG. 1. That is to say, base layer encoding components are not illustrated in FIG. 3 for simplicity. Therefore, video encoder 50 may be considered an enhancement layer encoder. Alternatively, the illustrated components of video encoder 50 could also be implemented in combination with base layer encoding modules or units, e.g., in a pyramid encoder design that supports scalable video coding of the base layer and the enhancement layer.

Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames.

As shown in FIG. 3, video encoder 50 receives a current video block 31 (e.g., an enhancement layer video block) within a video frame to be encoded. In the example of FIG. 3, video encoder 50 includes motion estimation unit 33, reference frame store 35, motion compensation unit 37, block transform unit 39, quantization unit 41, inverse quantization unit 42, inverse transform unit 44 and VLC unit 46. A deblocking filter (not shown) may also be included to filter block boundaries to remove blockiness artifacts. Video encoder 50 also includes summer 48 and summer 51. FIG. 3 illustrates the temporal prediction components of video encoder 50 for inter-coding of video blocks. Although not shown in FIG. 3 for ease of illustration, video encoder 50 also may include spatial prediction components for intra-coding of some video blocks. Spatial prediction components, however, are usually used only for base layer coding.

Motion estimation unit 33 compares video block 31 to blocks in one or more adjacent video frames to generate one or more motion vectors. The adjacent frame or frames may be retrieved from reference frame store 35, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 33 identifies a block in an adjacent frame that most closely matches the current video block 31, e.g., based on a rate distortion model, and determines a displacement between the blocks. On this basis, motion estimation unit 33 produces a motion vector (MV) (or multiple MV's in the case of bidirectional prediction) that indicates the magnitude and trajectory of the displacement between current video block 31 and a predictive block used to code current video block 31.

Motion vectors may have half- or quarter-pixel precision, or even finer precision, allowing video encoder 50 to track motion with higher precision than integer pixel locations and obtain a better prediction block. When motion vectors with fractional pixel values are used, interpolation operations are carried out in motion compensation unit 37. Motion estimation unit 33 may identify the best motion vector for a video block using a rate-distortion model. Using the resulting motion vector, motion compensation unit 37 forms a prediction video block by motion compensation.

Video encoder 50 forms a residual video block by subtracting the prediction video block produced by motion compensation unit 37 from the original, current video block 31 at summer 48. Block transform unit 39 applies a transform, such as a discrete cosine transform (DCT), to the residual block, producing residual transform block coefficients. Quantization unit 41 quantizes the residual transform block coefficients to further reduce bit rate. Summer 49A receives base layer coefficient information, e.g., from a base layer encoder (not show) and is positioned between block transform unit 39 and quantization unit 41 to supply this base layer coefficient information into the enhancement layer coding. In particular, summer 49A subtracts the base layer coefficient information from the output of block transform unit 39. In a similar fashion, summer 49B, which is positioned between inverse transform unit 44 and inverse quantization unit 42, also receives the base layer coefficient information from the base layer encoder (not shown). Summer 49B adds the base layer coefficient information back to the output of inverse quantization unit 42.

VLC unit 46 codes the quantized transform coefficients according a variable length coding methodology to even further reduce the bit rate of transmitted information. In particular, VLC unit 46 applies techniques of this disclosure to code the refinement coefficients of an enhancement layer. VLC unit 46 may also generate additional information to identify which tables the decoder should use for different types of video blocks. This additional information may be included in the coded bitstream so that the decoder can determine the proper tables for different types of video blocks, and then select such tables based on the type of video block being decoded.

Table selection by VLC unit 46 for the encoding of different video blocks may be performed based on information gathered for previously or currently coded frames. For example, statistical analysis of previously encoded frames may be performed to facilitate table selection by VLC unit 46. Such computationally intensive analysis, however, may be avoided at the decoder. Instead, information identifying tables for first and second types of video blocks, e.g., intra-coded block and inter-coded blocks, may be coded into the bitstream. The decoder device can use this transmitted information to facilitate proper table selections. Alternatively, in some cases, the encoding device and decoding device may have an agreement of which tables to use for different video block types.

Following the variable length coding, the encoded video may be transmitted to another device. In addition, inverse quantization unit 42 and inverse transform unit 44 apply inverse quantization and inverse transformation, respectively, to reconstruct the residual block. Summer 51 adds the reconstructed residual block to the motion compensated prediction block produced by motion compensation unit 37 to produce a reconstructed video block for storage in reference frame store 35. The reconstructed video block is used by motion estimation unit 33 and motion compensation unit 37 to encode a block in a subsequent video frame.

Figure 4:
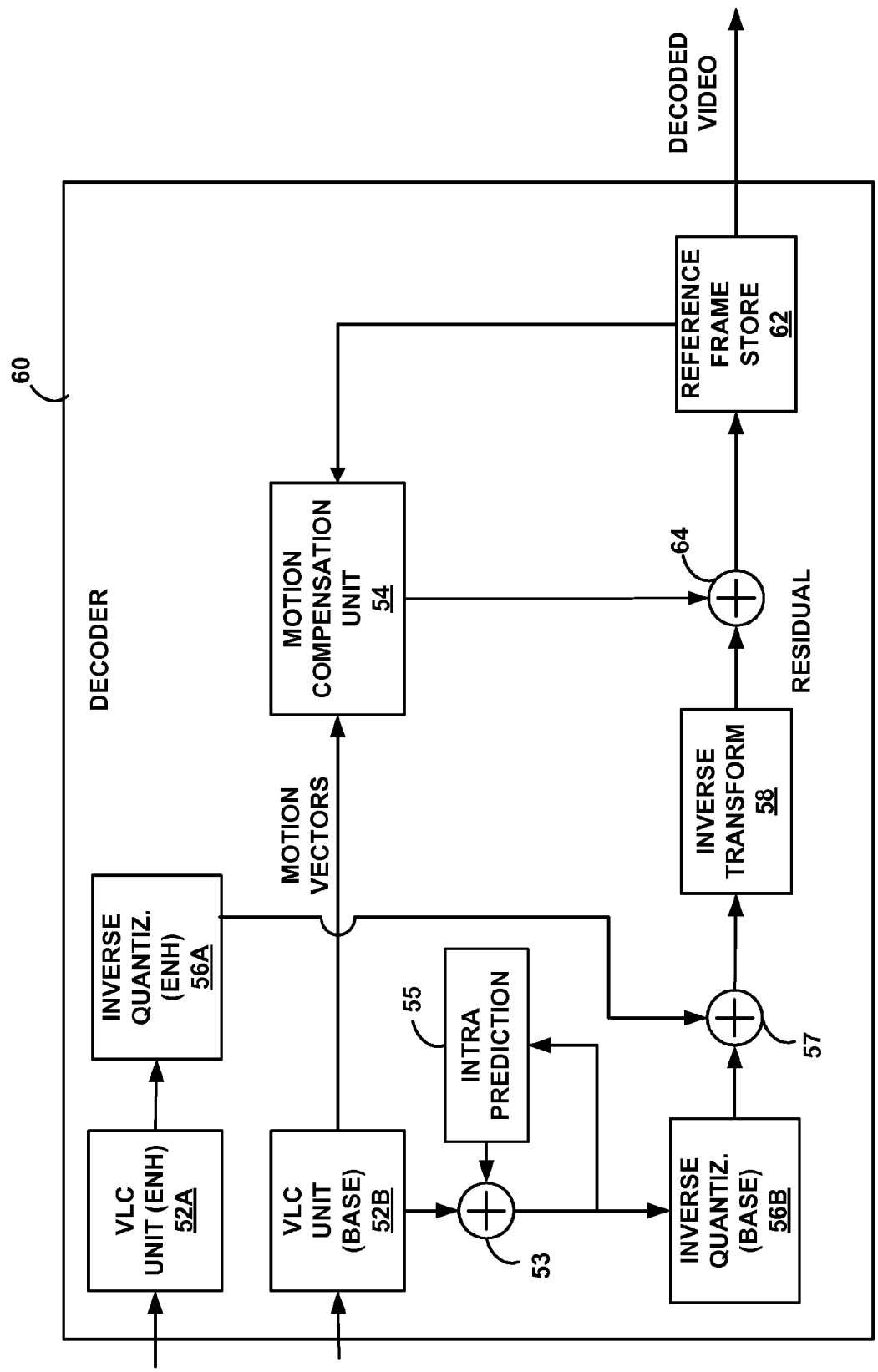
FIG. 4 is a block diagram illustrating an example of a video decoder consistent with this disclosure.

FIG. 4 is a block diagram illustrating an example of a video decoder 60, which may correspond to video decoder 28 of FIG. 1 that performs base layer and enhancement layer decoding. Video decoder 60 includes a VLC unit 52A for enhancement layer information, which performs the reciprocal function of VLC unit 46 of FIG. 3. That is to say, like VLC unit 46, VLC unit 52A codes the refinement coefficients of an enhancement layer. As noted, at the encoder, the VLC table selection for the encoding of different video blocks may be performed based on information gathered for previously or currently coded frames, e.g., using statistical analysis of previously encoded or currently encoded frames to facilitate table selection at the encoder. Such computationally intensive analysis, however, may be avoided at decoder 40. Instead, information identifying tables for first and second types of video blocks, e.g., intra-coded block and inter-coded blocks, may be transmitted from the encoder to decoder 60. Decoder 60 can use this transmitted information to facilitate proper table selections.

Video decoder 60 may also include another VLC unit 52B for base layer information. Intra prediction unit 55 may optionally perform any spatial decoding of base layer video blocks, and the output of intra prediction unit 55 may be provided to adder 53. The enhancement layer path may include inverse quantization unit 58A, and the base layer path may include inverse quantization unit 56B. The information in the base layer and enhancement layer paths may be combined by adder 57.

Video decoder 60 may perform intra- and inter-decoding of blocks within video frames. In the example of FIG. 4, video decoder 60 includes VLC units 52A and 52B (mentioned above), motion compensation unit 54, inverse quantization units 56A and 56B, inverse transform unit 58, and reference frame store 62. Video decoder 60 also includes summer 64. Optionally, video decoder 60 also may include a deblocking filter (not shown) that filters the output of summer 64. Again, summer 57 combines information in the base layer and enhancement layer paths, and intra prediction unit 55 and adder 53 facilitate any spatial decoding of base layer video blocks.

In accordance with this disclosure, VLC unit 52A receives enhancement layer information of an encoded video bitstream and applies the VLC techniques described in this disclosure. In particular, for refinement coefficients, the video bitstream may be coded to identify the appropriate VLC tables for two or more different types of video blocks. VLC unit 52A determines video block type for each video block being coded, and selects the appropriate VLC decoding table for a respective video block based on the information transmitted in the bitstream that identifies such VLC decoding tables for that video block type. The decoding process may produce quantized residual coefficients, macroblock and sub-block coding mode and motion information, which may include motion vectors and block partitions.

Following the decoding performed by VLC unit 52A, motion compensation unit 54 receives the motion vectors and one or more reconstructed reference frames from reference frame store 62. Inverse quantization unit 56A inverse quantizes, i.e., de-quantizes, the quantized block coefficients. Following combination of the enhancement and base layer information by adder 57, inverse transform unit 58 applies an inverse transform, e.g., an inverse DCT, to the coefficients to produce residual blocks. Motion compensation unit 54 produces motion compensated blocks that are summed by summer 64 with the residual blocks to form decoded blocks. If desired, a deblocking filter may also be applied to filter the decoded blocks in order to remove blockiness artifacts. The filtered blocks are then placed in reference frame store 62, which provides reference blocks from motion compensation and also produces decoded video to a drive display device (such as device 30 of FIG. 1).

Figure 5:
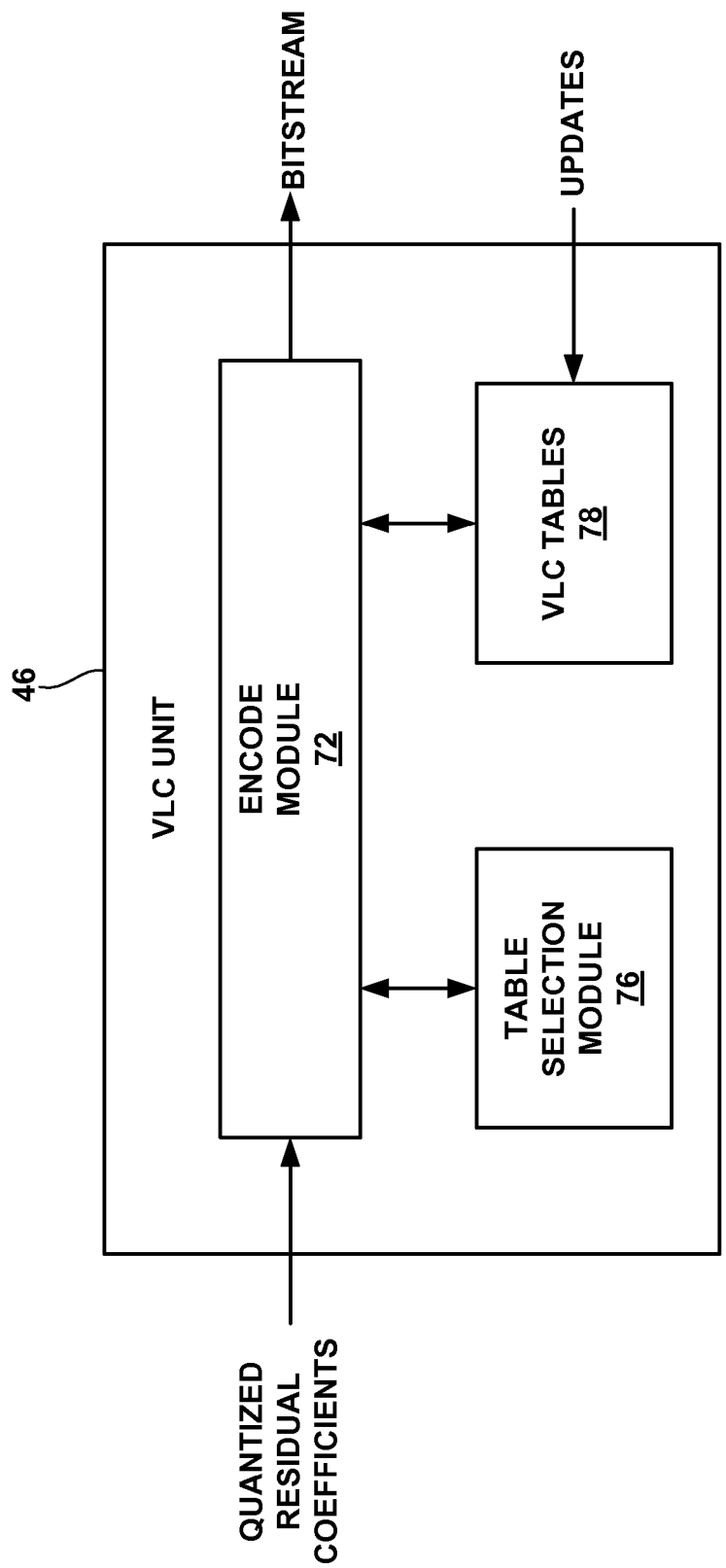
FIG. 5 is an exemplary block diagram of a variable length coding (VLC) encoding unit.

FIG. 5 is a block diagram illustrating an exemplary VLC unit 46, which may correspond to that shown in FIG. 3. VLC unit 46 includes an encode module 72, a table selection module 74, and VLC tables 78. VLC tables 78 generally refer to tables that may be stored in any location, e.g., locally or off-chip in a separate memory location. VLC tables 78 may be updated, periodically, as desired.

Encode module 72 encodes refinement coefficients and significant coefficients in separate coding passes. Table selection by VLC unit 46 for the encoding of coefficients associated with different video blocks may be performed based on information gathered for previously coded or currently coded frames. For example, statistical analysis of previously encoded frames may be performed to facilitate table selection by VLC unit 46. For the refinement coefficients (and possibly the other coefficients), VLC unit 46 generates information (which is then included in the coded bitstream) that identifies different VLC tables to use at the decoder for different types of video blocks. The decoder device can use this information to facilitate proper table selections. The information that identifies different VLC tables to use at the decoder for different types of video blocks may take different forms, but in one case, comprises two bits of information. The first bit identifies a table from two possible tables for intra-coded blocks, and the second bit identifies a table from two possible tables for inter-coded blocks. Of course, more information may be needed if there are more than two tables to choose from for each type of block.

Refinement coefficients may have values restricted to −1, 0 and 1, which may be coded by two bits of information. The first bit (coeff_ref_flag) may indicate whether the coefficient is equal to 0 (coeff_ref_flag=0) or not (coeff_ref_flag=1), and the second bit may indicate whether the sign (denoted as $s_n$) of the refinement coefficient same (coeff_ref_dir_flag=0) or different (coeff_ref_dir_flag=1) than the sign (denoted as $s_{n-1}$) of the corresponding coefficient of the previous layer. The previous layer is denoted as $s_{n-1}$. If the sign of current coefficient is the same as that of the previous layer, then coeff_ref_dir_flag=0, and if the sign of current coefficient is different than that of the previous layer then coeff_ref_dir_flag=1. The two refinement bits may be combined into an alphabet of three refinement symbols as follows in Table 1:

TABLE 1

| coeff_ref_flag | coeff_ref_dir_flag | ref_symbol |
|---|---|---|
| 0 | — | 0 |
| 1 | 0 | 1 |
| 1 | 1 | 2 |

Alternatively, another scheme could also be used to code the refinement coefficients without departing from the techniques of this disclosure.

VLC tables 78 may comprise variable length codewords that are mapped to different sets of coefficients, which may be defined by symbols, flags, or other types of bits. VLC tables 78 may be updated, as desired. Any number of tables may be included in VLC tables 88. In some cases, two tables are used, although more could be included. In any case, encode module 72 may access different ones of VLC tables for different types of video blocks, and may convey information regarding these tables for different types of video blocks as part of the encoded bitstream. In this way, the decoder device need not perform any computationally intensive statistical analysis to determine which tables to use, and instead, can simply identify the tables from the information in the coded bitstream. The tables used in the coding of different types of video blocks may be defined once per frame, once per slice, once per FGS layer of a frame, or once per other type of coded unit.

Figure 6:
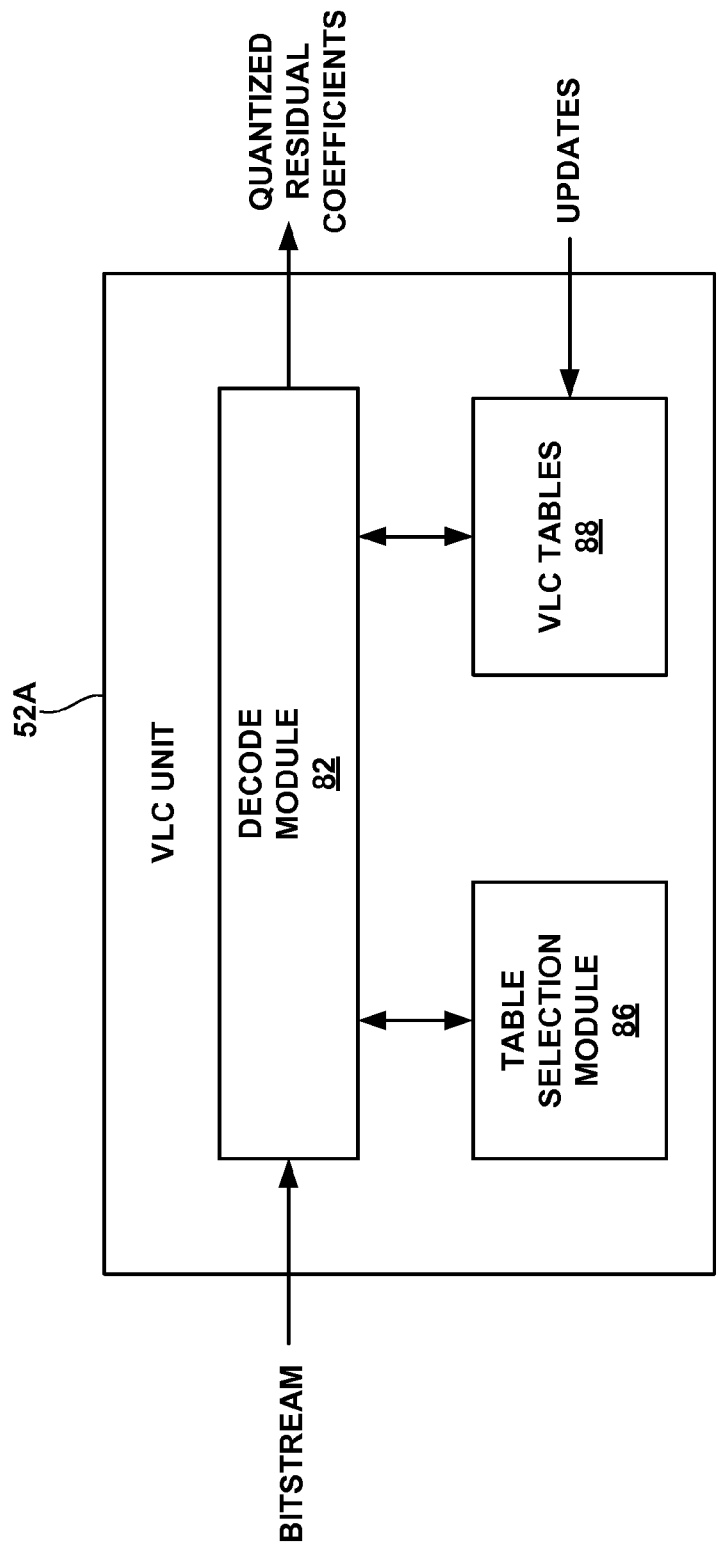
FIG. 6 is an exemplary block diagram of a VLC decoding unit.

FIG. 6 is a block diagram illustrating an exemplary VLC unit 52A, which may correspond to VLC unit 52A shown in FIG. 4. VLC unit 52A performs reciprocal decoding functions relative to the encoding that is performed by VLC unit 46. Thus, whereas VLC unit 46 receives quantized residual coefficients and generates a bitstream, VLC unit 52A receives a bitstream and generates quantized residual coefficients. However, unlike VLC unit 46, VLC decode unit need not perform any computationally intensive statistical analysis to determine which tables to use, and instead, can simply identify the tables from the information in the coded bitstream and select a table for a given video block based on block type of that video block.

VLC unit 52A includes a decode module 82, a table selection module 86, and one or more VLC tables 88. Like in unit 46, VLC tables 88 of unit 52 generally refer to tables that may be stored in any location, e.g., locally or off-chip in a separate memory location. VLC tables 88 may be updated, periodically, as desired. Any number of tables may be included in VLC tables 88. In some cases two tables are used, although more could be included.

VLC decode unit 82 may perform separate decoding passes for significant coefficients and refinement coefficients. The techniques of this disclosure may be applicable to the coding or refinement coefficients only, or could be used for both refinement and significant coefficients.

The encoded bitstream received by decode module 82 includes information representing the encoded coefficients, e.g., codewords, and information that identifies tables to be used in the decoding of different types of video blocks. Table selection module 86 determines which tables should be used for the different types of video blocks for each coded unit, such as for each frame. Decode module 82 then decodes the received information based on the appropriate VLC tables 86, as defined by table selection module 86, to generate the quantized residual coefficients that were coded in the bitstream.

Figure 7:
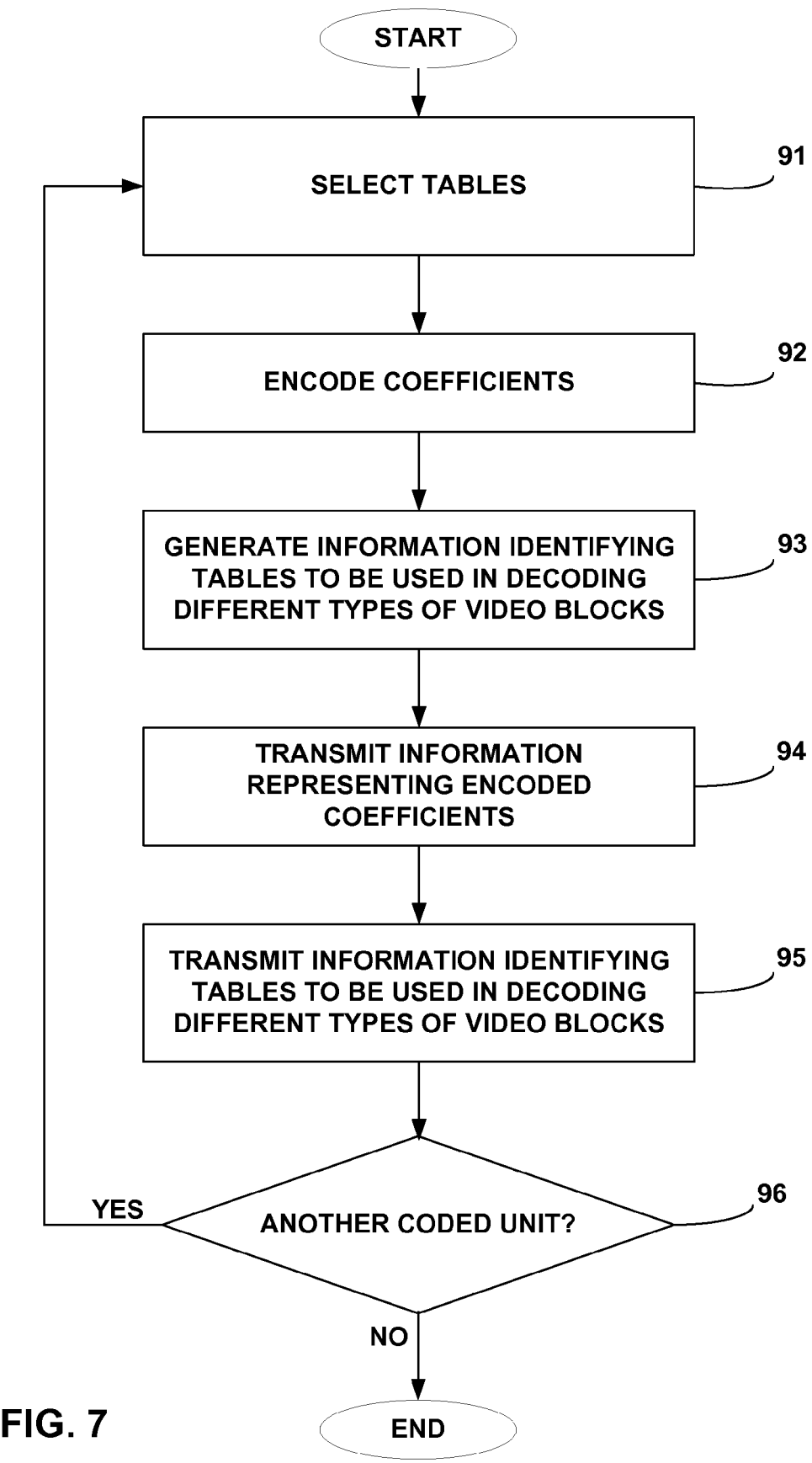
FIG. 7 is a flow diagram illustrating a VLC technique for variable length encoding consistent with this disclosure.

FIG. 7 is a flow diagram illustrating an encoding technique for variable length coding of coefficients (e.g., typically refinement coefficients) of an enhancement layer consistent with this disclosure. As shown in FIG. 7, table selection module 76 selects appropriate tables to be used for the encoding (91). The selected tables may promote coding efficiency, and may be selected based on statistical analysis of previously coded or currently coded video frames. In particular, table selection module 76 may select different VLC tables to be used in coding of video blocks based on quantization levels associated with such blocks and corresponding statistics that indicate which tables were used as similar quantization levels.

Encode module 72 encodes coefficients by performing table lookups into VLC tables 78 (92), which were selected by table selection module 76. Sets of coefficients (such as sets of zero run lengths, or sets of coded block patterns) may be assigned variable length codes in the VLC tables. In this way, more likely sets of coefficients may be coded with shorter length code words, and less likely sets of coefficients may be coded with shorter length code words to promote coding efficiency.

Different VLC tables may be selected for different types of video blocks, e.g., intra-coded blocks and inter-coded blocks, since these different types of video blocks are typically coded at different levels of quantization. VLC unit 46 generates information identifying tables to be used for decoding the different video block types (93). The output bitstream of VLC unit 46 may include both information representing the encoded coefficients and information identifying the tables to be used in the decoding of different types of video blocks.

The output bitstream may be forwarded to a transmitter (such as modulator/transmitter 24 of FIG. 1) for transmission to receive device 16 over communication channel 15. This transmission of the bitstream includes transmission of information representing the encoded coefficients (94), which may comprise codewords selected from VLC tables 78. In addition, the transmission of the bitstream includes transmission of information identifying the tables to be used in decoding different types of video blocks (95). The process of FIG. 7 may be repeated for every coded unit (96), such as for every slice or every frame to be coded.

Figure 8:
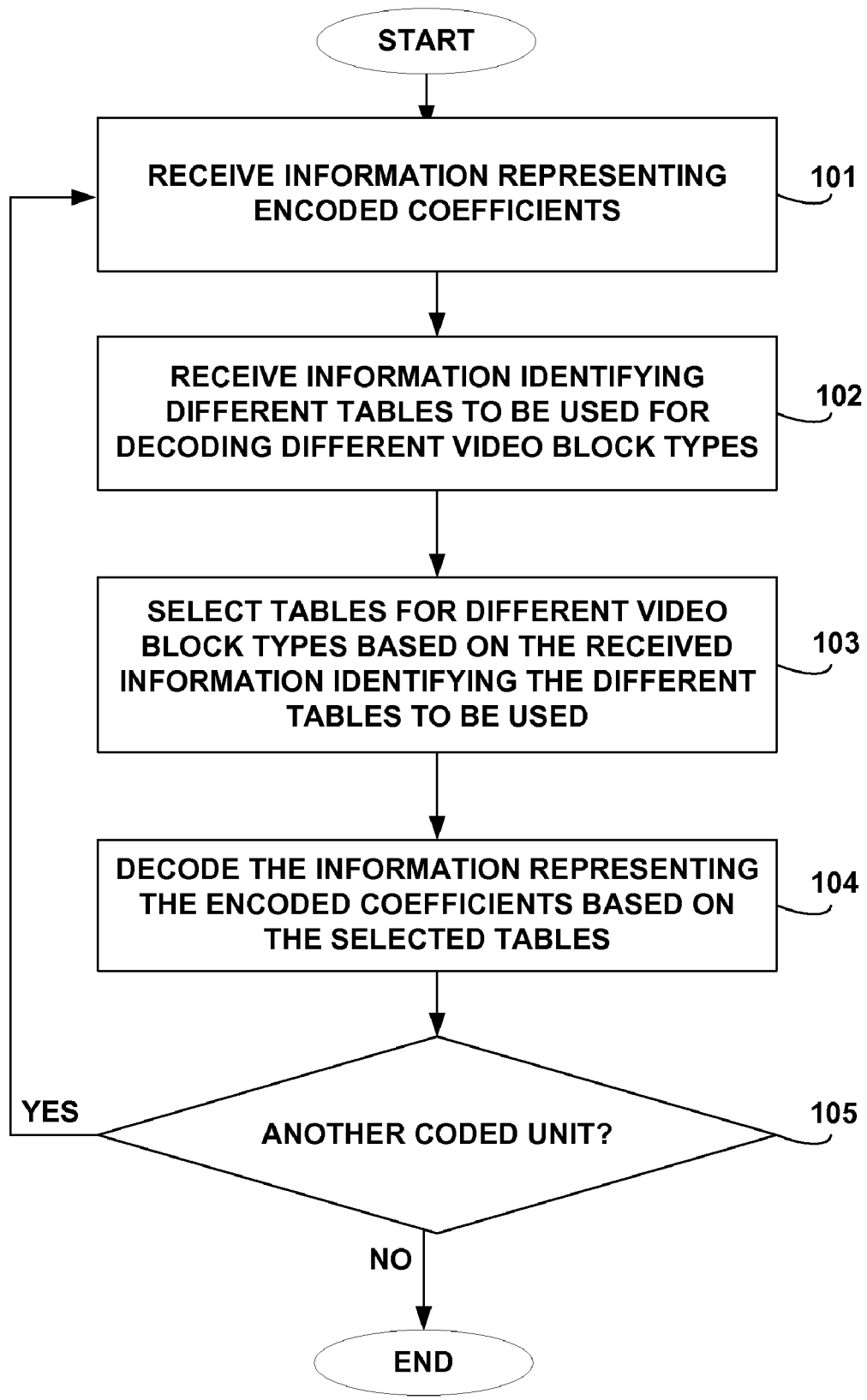
FIG. 8 is a flow diagram illustrating a VLC technique for variable length decoding consistent with this disclosure.

FIG. 8 is a flow diagram illustrating a decoding technique for variable length coding coefficients (typically refinement coefficients) of an enhancement layer consistent with this disclosure. As shown in FIG. 8, VLC decode module 82 receives information representing encoded coefficients (101), and receives information identifying different tables to be used for decoding different video block types (102). A receiver, such receiver/demodulator 26 (FIG. 1) may facilitate reception of this information from a communication channel 15.

Table selection module 86 selects tables for different video block types based on the received information identifying the different tables to be used (103). The different video block types may comprise intra-coded blocks and inter-coded blocks. Accordingly, intra-coded blocks and inter-coded blocks may be assigned different VLC tables for every coded unit, e.g., every frame or every slice. Decode module 82 decodes the information representing the encoded coefficients based on the selected tables (104). For example, decode module 82 may access the selected ones of VLC tables 88 and perform table lookups to decode the information to generate the coefficients. The process of FIG. 8 repeats for every coded unit (105). Alternatively, if an agreement between the encoder and the decoder was pre-established regarding the tables to use for different block types, step 102 may be eliminated, and the table selection of step 103 could be based only on the type of block to be decoded.

As described herein, at the encoder, table selection for the encoding of refinement coefficients associated with different types of video blocks may be performed based on information gathered for previously coded or currently coded frames. Statistical analysis of previously encoded frames may be performed, for example, to facilitate table selection at the encoder. For example, refinement coefficients may be encoded using the available tables, and the table that provides gives the fewest number of bits to encode the information may be selected. Such computationally intensive analysis, however, may be avoided at the decoder. Instead, information identifying tables for first and second types of video blocks, e.g., intra-coded block and inter-coded blocks, may be transmitted from the encoder to the decoder. The decoder can use this transmitted information to facilitate proper table selections based on block type.

The selected tables may be dependent upon the level of quantization used in the coding process. The level of quantization used, in turn, may be dependent upon the type of video block. Since the level of quantization used at the encoder is generally unknown to the decoder, information regarding video block type provides a useful selection tool to apply at the decoder. Therefore, tables are identified to the decoder for different video block types, and the decoder can determine the type associated with a respective video block and select the appropriate VLC table to decode that respective video block. The tables for the different types of video blocks may change on a frame-by-frame basis (or a slice-by-slice basis).

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

This disclosure may also be directed to a circuit, such as an integrated circuit, chipset ASIC, FPGA, logic or various combinations thereof configured to perform one or more of the techniques described herein. Accordingly, this disclosure also contemplates a circuit configured for coding an enhancement layer of an SVC scheme, wherein the circuit is configured to encode coefficients associated with video blocks of the enhancement layer based on variable length coding tables, generate information identifying a first variable length coding table to be used by a decoding device to decode a first type of the video blocks and a second variable length coding table to be used by the decoding device to decode a second type of the video blocks, transmit information representing the encoded coefficients to a decoding device, and transmit the information identifying the first variable length coding table to be used by the decoding device to decode the first type of the video blocks and the second variable length coding table to be used by the decoding device to decode the second type of the video blocks.

This disclosure also contemplates a circuit configured for coding an enhancement layer of a scalable video coding (SVC) scheme, wherein the circuit is configured to receive information representing encoded coefficients associated with video blocks of the enhancement layer, receive information identifying a first variable length coding table to be used to decode a first type of the video blocks and a second variable length coding table to be used to decode a second type of the video blocks, select tables for decoding the information representing the encoded coefficients based on the information identifying the first and second variable length coding table to be used, and decode the information representing the encoded coefficients based on the selected tables.

In addition, this disclosure contemplates a circuit configured for coding an enhancement layer of a SVC scheme, wherein the circuit is configured to receive information representing encoded coefficients associated with video blocks of the enhancement layer, select different variable length coding tables to be used to decode the information based on block types associated with the video blocks in accordance with an agreement established with an encoder, decode the information representing the encoded coefficients based on the selected tables.

Various embodiments of the invention have been described. These and other embodiments are within the scope of the following claims.

The invention claimed is:

1. A method comprising:
   encoding coefficients of a plurality of scalable video coding (SVC) layers of an SVC scheme, wherein the encoding of the coefficients associated with video blocks is based on different variable length coding tables for each of the respective SVC layers;
   for each respective SVC layer of the plurality of SVC layers, generating information identifying a first variable length coding table to be used by a decoding device to decode a first type of the video blocks of coding units included in the respective SVC layer and a second variable length coding table to be used by the decoding device to decode a second type of the video blocks of coding units included in the respective SVC layer, wherein generating information identifying the first variable length coding table to be used by the decoding device to decode the first type of the video blocks and the second variable length coding table to be used by the decoding device to decode the second type of the video blocks includes performing statistical analysis of information gathered for previously coded units or currently coded units;
   outputting information representing the encoded coefficients to a decoding device for each of the coded units; and
   for each of the coded units of each SVC layer of the respective SVC layers, outputting the information identifying the first variable length coding table to be used by the decoding device to decode the first type of the video blocks and the second variable length coding table to be used by the decoding device to decode the second type of the video blocks, wherein the information identifying the first variable length coding table to be used by the decoding device to decode the first type of the video blocks and the second variable length coding table to be used by the decoding device to decode the second type of the video blocks is transmitted once for each of the coded units.

2. The method of claim 1, wherein the coded units comprise frames, and wherein encoding the coefficients comprises selecting the first and second variable length coding tables based on information gathered for previously coded frames.

3. The method of claim 2, wherein selecting the first and second coding tables comprises selecting the first and second coding tables from two or more possible tables.

4. The method of claim 1, wherein the first type of the video blocks comprises an intra-coded video block and the second type of the video blocks comprises an inter-coded video block.

5. The method of claim 1, wherein the video blocks are arranged in frames and the coded units are the frames, the method further comprising, for each of the frames, transmitting the information identifying the first and second variable length coding tables to be used.

6. The method of claim 1, wherein the information representing the encoded coefficients comprises codewords selected from one or more of the variable length coding tables.

7. The method of claim 1, wherein the video blocks comprise video blocks of an enhancement layer of a scalable video coding scheme.

8. The method of claim 1,
   wherein the at least one of the respective SVC layers is a first enhancement layer comprising refinement coefficients for which corresponding coefficients included in a first previous layer of the SVC scheme that had non-zero values, and
   wherein the plurality SVC layers comprises a second enhancement layer comprising significant coefficients for which corresponding coefficients included in a second previous layer of the SVC scheme that had zero values.

9. A method comprising:
   receiving information representing encoded coefficients included in a scalable video coding (SVC) layer of a plurality of SVC layers of an SVC scheme, wherein the encoded coefficients are associated with video blocks for each of a plurality of coded units;
   for each of the coded units, receiving information identifying a first variable length coding table to be used to decode a first type of the video blocks of coding units included in the respective SVC layer and a second variable length coding table to be used to decode a second type of the video blocks of coding units included in the respective SVC layer, wherein the first and second variable length coding tables are included in a plurality of different variable coding tables for each of the respective VLC layers;
   for each of the coded units, selecting the first and second variable length coding tables for decoding the information representing the encoded coefficients based on the information identifying the first and second variable length coding tables to be used; and decoding the information representing the encoded coefficients based on the selected tables, wherein the information identifying the first variable length coding table to be used to decode the first type of the video blocks and the second variable length coding table to be used to decode the second type of the video blocks is received once for each of the coded units.

10. The method of claim 9, wherein selecting the first and second coding tables comprises selecting the first and second coding tables from two or more possible tables.

11. The method of claim 9, wherein the first type of the video blocks comprises an intra-coded video block and the second type of the video blocks comprises an inter-coded video block.

12. The method of claim 9, wherein the coded units comprise frames, the method further comprising receiving the information identifying the first and second variable length coding tables to be used once per frame.

13. The method of claim 9, wherein the information representing the encoded coefficients comprises codewords selected from one or more of the variable length coding tables by an encoder.

14. The method of claim 9, wherein the video blocks comprise video blocks of an enhancement layer of a scalable video coding scheme.

15. The method of claim 9,
wherein the SVC layer of the plurality of SVC layers of the SVC scheme is a first enhancement layer comprising refinement coefficients for which corresponding coefficients included in a first previous layer of the SVC scheme that had non-zero values, and
wherein the plurality SVC layers comprises a second enhancement layer comprising significant coefficients for which corresponding coefficients included in a second previous layer of the SVC scheme that had zero values.

16. A device comprising:
a memory configured to store data associated with video blocks; and
a processor configured to:
encode coefficients of a plurality of scalable video coding (SVC) layers of an SVC scheme, wherein the encoding of the coefficients associated with the video blocks based on variable length coding tables for each of the respective SVC layers, and for each respective SVC layer of the plurality of SVC layers, generates information identifying a first variable length coding table to be used by a decoding device to decode a first type of the video blocks of coding units included in the respective SVC layer and a second variable length coding table to be used by the decoding device to decode a second type of the video blocks of coding units included in the respective SVC layer, wherein generating the information identifying the first variable length coding table to be used by the decoding device to decode the first type of the video blocks and the second variable length coding table to be used by the decoding device to decode the second type of the video blocks includes performing statistical analysis of information gathered for previously coded units or currently coded units associated; and
output information representing the encoded coefficients for each of the coded units of each SVC layer of the respective SVC layers, and for each of the coded units transmits the information identifying a first variable length coding table to be used by the decoding device to decode the first type of the video blocks and the second variable length coding table to be used by the decoding device to decode a second type of video block, wherein the information identifying the first variable length coding table to be used by the decoding device to decode the first type of the video blocks and the second variable length coding table to be used by the decoding device to decode the second type of the video blocks is transmitted once for each of the coded units.

17. The device of claim 16, wherein the coded units comprise frames, and wherein the processor selects the first and second variable length coding tables based on information gathered for previously coded frames.

18. The device of claim 16, wherein the first type of the video blocks comprises an intra-coded video block and the second type of the video blocks comprises an inter-coded video block.

19. The device of claim 16, wherein the video blocks are arranged in frames and the coded units are the frames, and the transmitter transmits the information identifying the first and second variable length coding tables to be used once for each of the frames.

20. The device of claim 16, wherein the information representing the encoded coefficients comprises codewords selected from one or more of the variable length coding tables.

21. The device of claim 16, wherein the device comprises at least one of:
a circuit; and
a wireless communication device.

22. The device of claim 16, wherein the video blocks comprise video blocks of an enhancement layer of a scalable video coding scheme.

23. The device of claim 16,
wherein the at least one of the respective SVC layers is a first enhancement layer comprising refinement coefficients for which corresponding coefficients included in a first previous layer of the SVC scheme that had non-zero values, and
wherein the plurality SVC layers comprises a second enhancement layer comprising significant coefficients for which corresponding coefficients included in a second previous layer of the SVC scheme that had zero values.

24. A device comprising:
a memory configured to store information representing encoded coefficients included in a scalable video coding (SVC) layer of a plurality of SVC layers of an SVC scheme, wherein the encoded coefficients are associated with video blocks for each of a plurality of coded units, and for each of the coded units, receives information identifying a first variable length coding table to be used to decode a first type of the video blocks of coding units included in the respective SVC layer and a second variable length coding table to be used to decode a second type of the video blocks of coding units included in the respective SVC layer, wherein the first and second variable length coding tables are included in a plurality of different variable coding tables for each of the respective VLC layers; and
a decoder that is configured to, for each of the coded units, select the first and second variable length coding tables for decoding the information representing the encoded coefficients based on the information identifying the first and second variable length coding tables to be used, and decodes the information representing the encoded coefficients based on the selected tables, wherein the information identifying the first variable length coding table to be used to decode the first type of the video blocks and the second variable length coding table to be used to decode the second type of the video blocks is received once for each of the coded units.

25. The device of claim 24, wherein the first type of the video blocks comprises an intra-coded video block and the second type of video blocks comprises an inter-coded video block.

26. The device of claim 24, wherein the video blocks are arranged in frames coded unit comprise frames, and the receiver receives the information identifying the first and second variable length coding tables to be used once for each of the frames.

27. The device of claim 24, wherein the device comprises at least one of:
 a circuit; and
 a wireless communication device.

28. The device of claim 24, wherein the video blocks comprise video blocks of an enhancement layer of a scalable video coding scheme.

29. The device of claim 24,
 wherein the SVC layer of the plurality of SVC layers of the SVC scheme is a first enhancement layer comprising refinement coefficients for which corresponding coefficients included in a first previous layer of the SVC scheme that had non-zero values, and
 wherein the plurality SVC layers comprises a second enhancement layer comprising significant coefficients for which corresponding coefficients included in a second previous layer of the SVC scheme that had zero values.

30. A non-transitory computer readable medium having stored thereon instructions that when executed by a processor cause the processor to:
 receive information representing encoded coefficients included in a scalable video coding (SVC) layer of a plurality of SVC layers of an SVC scheme, wherein the encoded coefficients are associated with video blocks for each of a plurality of coded units;
 for each of the coded units, receive information identifying a first variable length coding table to be used to decode a first type of the video blocks of coding units included in the respective SVC layer and a second variable length coding table to be used to decode a second type of the video blocks of coding units included in the respective SVC layer, wherein the first and second variable length coding tables are included in a plurality of different variable coding tables for each of the respective VLC layers;
 for each of the coded units, select the first and second variable length coding tables for decoding the information representing the encoded coefficients based on the information identifying the first and second variable length coding tables to be used; and
 decode the information representing the encoded coefficients based on the selected tables, wherein the information identifying the first variable length coding table to be used to decode the first type of the video blocks and the second variable length coding table to be used to decode the second type of the video blocks is received once for each of the coded units.

31. An apparatus for decoding video data, comprising:
 means for storing video data associated with video blocks;
 means for processing configured to:
  receive information representing encoded coefficients included in a scalable video coding (SVC) layer of a plurality of SVC layers of an SVC scheme, wherein the encoded coefficients are associated with the video blocks of the for each of a plurality of coded units;
  for each of the coded units, receive information identifying a first variable length coding table to be used to decode a first type of the video blocks of coding units included in the respective SVC layer and a second variable length coding table to be used to decode a second type of the video blocks of coding units included in the respective SVC layer, wherein the first and second variable length coding tables are included in a plurality of different variable coding tables for each of the respective VLC layers;
  for each of the coded units, select the first and second variable length coding tables for decoding the information representing the encoded coefficients based on the information identifying the first and second variable length coding tables to be used; and
  decode the information representing the encoded coefficients based on the selected tables, wherein the information identifying the first variable length coding table to be used to decode the first type of the video blocks and the second variable length coding table to be used to decode the second type of the video blocks is received once for each of the coded units.

32. The apparatus of claim 31,
 wherein the SVC layer of the plurality of SVC layers of the SVC scheme is a first enhancement layer comprising refinement coefficients for which corresponding coefficients included in a first previous layer of the SVC scheme that had non-zero values, and
 wherein the plurality SVC layers comprises a second enhancement layer comprising significant coefficients for which corresponding coefficients included in a second previous layer of the SVC scheme that had zero values.

* * * * *